(12) United States Patent
Stepanova et al.

(10) Patent No.: US 12,008,481 B2
(45) Date of Patent: Jun. 11, 2024

(54) DEVICE AND METHOD FOR MACHINE LEARNING

(71) Applicant: Robert Bosch GmbH, Stuttgart (DE)

(72) Inventors: Daria Stepanova, Renningen (DE); Heike Adel-Vu, Stuttgart (DE); Mohamed Gad-Elrab, Saarbruecken (DE); Trung Kien Tran, Ulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 930 days.

(21) Appl. No.: 17/032,475

(22) Filed: Sep. 25, 2020

(65) Prior Publication Data

US 2021/0142193 A1 May 13, 2021

(30) Foreign Application Priority Data

Nov. 12, 2019 (EP) .................................... 19208571

(51) Int. Cl.
*G06F 18/24* (2023.01)
*G06N 5/04* (2023.01)
*G06N 20/00* (2019.01)

(52) U.S. Cl.
CPC ............... *G06N 5/04* (2013.01); *G06F 18/24* (2023.01); *G06N 20/00* (2019.01)

(58) Field of Classification Search
None
See application file for complete search history.

(56) References Cited

U.S. PATENT DOCUMENTS

| 7,643,686 B2 * | 1/2010 | Kraus | G06F 16/55 382/225 |
| 2010/0008540 A1 | 1/2010 | Shet et al. | |
| 2015/0006712 A1 * | 1/2015 | Khann | H04L 67/52 709/224 |
| 2015/0127323 A1 * | 5/2015 | Jacquet | G06F 40/247 704/9 |

(Continued)

OTHER PUBLICATIONS

Ilaria Tiddi, et al., "Explaining Clusters With Inductive Logic Programming and Linked Data," Proceedings of the 12th International Semantic Web Conference (Posters & Demonstrations Track), vol. 1035 (ISWC-PD '13), ceur-ws.org, 2013, pp. 1-4.

(Continued)

*Primary Examiner* — Xuyang Xia
(74) *Attorney, Agent, or Firm* — NORTON ROSE FULBRIGHT US LLP; Gerard A. Messina

(57) ABSTRACT

A computer-implemented method for grouping target entities into clusters. A base association in which a cluster is associated with each of the target entities is determined in a computation step for the target entities as a function of an association for entities. Inference rules are determined as a function of the association for entities and as a function of the base association, each of the inference rules defining an association of entities with one of the clusters. An altered association is determined as a function of the association for entities and the inference rules. A check is made as to whether a difference between the base association and the altered association falls below a threshold value. When it does, an association of the target entities with the clusters is output or stored. Otherwise, a feedback value is determined as a function of the difference.

11 Claims, 1 Drawing Sheet

(56) References Cited

U.S. PATENT DOCUMENTS

| | | | |
|---|---|---|---|
| 2017/0109615 A1* | 4/2017 | Yatziv | G06F 18/24323 |
| 2020/0050946 A1* | 2/2020 | Lecue | G06F 18/22 |
| 2020/0233899 A1* | 7/2020 | McAuliffe | G06F 16/9024 |

OTHER PUBLICATIONS

Ilaria Tiddi, et al., "Data Patterns Explained With Linked Data," Proceedings of the 2015 European Conference on Machine Learning and Knowledge Discovery in Databases, vol. Part III (ECMLPKDD'15), Springer, 2015, pp. 271-275.

Bo Yang, et al., "Towards K-Means-Friendly Spaces: Simultaneous Deep Learning and Clustering," Proceedings of the 34th International Conference on Machine Learning, vol. 70 (ICML '17), jmlr.org, 2017, pp. 1-14.

* cited by examiner

DEVICE AND METHOD FOR MACHINE LEARNING

CROSS REFERENCE

The present application claims the benefit under 35 U.S.C. § 119 of European Patent Application No. EP 19208571.0 filed on Nov. 12, 2019, which is expressly incorporated herein by reference in its entirety.

BACKGROUND INFORMATION

In knowledge-based systems, knowledge in the form of a knowledge graph may be stored in a structured manner. Knowledge graphs include entities, and express relationships between entities. A plurality of entities of a knowledge graph may be combined as a cluster, i.e., a group of entities. Methods for elucidating such clusters are described in Ilaria Tiddi, Mathieu D'Aquin, and Enrico Motta, 2013, "Explaining clusters with inductive logic programming and linked data," Proceedings of the 12th International Semantic Web Conference (Posters & Demonstrations Track)—Volume 1035 (ISWC-PD '13), Eva Blomqvist and Tudor Groza (Eds.), Vol. 1035, CEUR-WS.org, Aachen, Germany, 257-260, and Ilaria Tiddi, Mathieu d'Aquin, and Enrico Motta, 2015, "Data patterns explained with linked data," Proceedings of the 2015 European Conference on Machine Learning and Knowledge Discovery in Databases—Volume Part III (ECMLPKDD'15), Albert Bifet, Michael May, Bianca Zadrozny, Ricard Gavalda, and Dino Pedreschi (Eds.), Vol. Part III, Springer, Switzerland, 271-275. For this purpose, patterns that are defined by the entities of a cluster are extracted, in which the relationships between the entities of the cluster are analyzed. The pattern that is best suited for the description is selected from the patterns, based on multiple evaluation metrics. This procedure presumes clusters that are already predefined. It is difficult to find valid descriptions for predefined diffuse clusters.

In Bo Yang, Xiao Fu, Nicholas D. Sidiropoulos, and Mingyi Hong, 2017, "Towards K-means-friendly spaces: simultaneous deep learning and clustering," Proceedings of the 34th International Conference on Machine Learning—Volume 70 (ICML '17), Doina Precup and Yee Whye Teh (Eds.), Vol. 70, JMLR.org, 3861-3870, deep neural networks are used to group data that are represented in high-dimensional state spaces. A description of the clusters is determined, based on a measure for a divergence between the clusters. It is presumed that the data are already completely present in a high-dimensional vector space. Since the clusters are determined based on statistical testing, it is difficult to ensure the quality of the grouping into the clusters and the explainability of the clusters thus determined.

To determine an explanation for a cluster, two separate objects are to be achieved with these procedures. The clusters must be determined based on a similarity measure, and a possible description for each of the clusters must subsequently be found.

SUMMARY

A method and the device according to present invention represent an improved procedure in comparison.

In accordance with an example embodiment of the present invention, a computer-implemented method for grouping target entities into clusters provides that a base association in which a cluster is associated with each of the target entities is determined in a computation step for the target entities as a function of an association for entities, inference rules being determined as a function of the association for entities and as a function of the base association, each of the inference rules defining an association of entities with one of the clusters, an altered association being determined as a function of the association for entities and the inference rules, a check being made as to whether a difference between the base association and the altered association falls below a threshold value, and when the difference falls below the threshold value an association of the target entities with the clusters being output or stored, and otherwise a feedback value being determined as a function of the difference, and an association being determined, as a function of the association for entities and the feedback value, which replaces the association for a new execution of the computation step. The associations may be represented by knowledge graphs. In this way, for a given knowledge graph and a set of predefined target entities, a set of entities of the knowledge graph are better grouped into clusters. This represents an iterative process in which the target entities are grouped into a cluster or multiple clusters, and this grouping is returned for redetermining altered clusters. On the one hand, an explainable cluster is thus learned. In addition, the precision with which the entities are associated with a cluster that is meaningful with regard to the description is improved.

A symbolic description of the clusters is preferably determined as a function of the association, the symbolic description being output or stored. This represents an iterative process in which a description is determined for the one or multiple clusters, and this description is returned for redetermining altered clusters. The precision of the description of the clusters is thus greatly improved.

A measure for a quality of the inference rule is preferably determined for each inference rule from a plurality of inference rules that defines an association of entities with the same cluster, and the inference rule with the greatest measure for the quality compared to the other of the inference rules for the same cluster being selected. The overall quality of the association is thus improved.

The base association preferably includes a map of at least a portion of the association for entities into a multidimensional state space, the inference rules being determined as a function of the map. The map represents an embedding of the association—in the example, a knowledge graph embedding. Problems that could otherwise occur with incomplete knowledge graphs may thus be avoided.

The entities may include subjects and objects, the association defining predicates, each of the predicates associating an object with a subject, as a function of the feedback value at least one predicate for an object and a subject being determined that is added to the association for the new execution of the computation step, or is removed from same. Subjects, objects, and predicates represent facts in the knowledge graph. As a result, facts from the state graph are either added or removed for subsequent computation steps.

The base association preferably includes subjects and objects as entities, the subjects representing target entities, the objects representing clusters, the association defining predicates, each of the predicates associating an object with a subject, each of the inference rules including a trunk and a head that is associated with the trunk, the trunk being defined as a function of at least one predicate or as a function of a conjunction of at least two predicates, the head defining, for a subject that represents one of the target entities, with which of the objects, which represent the clusters, this subject is associated. This form of the inference rules is particularly well-suited for the iterative procedure.

An inference rule is preferably provided based on background knowledge, independently of the base association, the altered association being determined as a function of the association for entities, the inference rules, and this inference rule. In this way, inference rules that are available from background knowledge may be easily taken into account, independently of the iterations.

The entities preferably include subjects and objects, the association defining predicates, each of the predicates associating an object with a subject, the symbolic description being defined as a function of at least one predicate or as a function of a conjunction of at least two predicates. This description may also be used for queries.

A plurality of digital images is preferably provided, one of the target entities that characterizes an object from the digital image being determined for each of the digital images, in particular as a function of data or metadata of the digital image, the association of the target entities with at least one cluster that represents a concept, a scene, or an object being determined. The association is determined, for example, as a knowledge graph from data from a plurality of annotated images. Based on the data of digital images, the concepts, the scenes, or the objects contained therein are thus learned.

In accordance with an example embodiment of the present invention, a corresponding device for grouping target entities into clusters includes a data memory for associations and inference rules, the device including a grouping device that is designed to determine a base association in which a cluster is associated with each of the target entities, as a function of the target entities and as a function of an association for entities, a learning device that is designed to determine inference rules as a function of the association for entities and as a function of the base association, each of the inference rules defining an association of entities with one of the clusters, and the learning device being designed to determine an altered association as a function of the association for entities and the inference rules, and a feedback device that is designed to check whether a difference between the base association and the altered association falls below a threshold value, and if the difference falls below the threshold value, to output or store an association of the target entities with the clusters, and that otherwise, is designed to determine a feedback value as a function of the difference, and to determine an association that replaces the association, as a function of the association for entities and the feedback value.

The device is preferably designed to carry out other steps of the method.

Further advantageous specific embodiments result from the following description and the figures.

DETAILED DESCRIPTION OF EXAMPLE EMBODIMENTS

Figure 1:
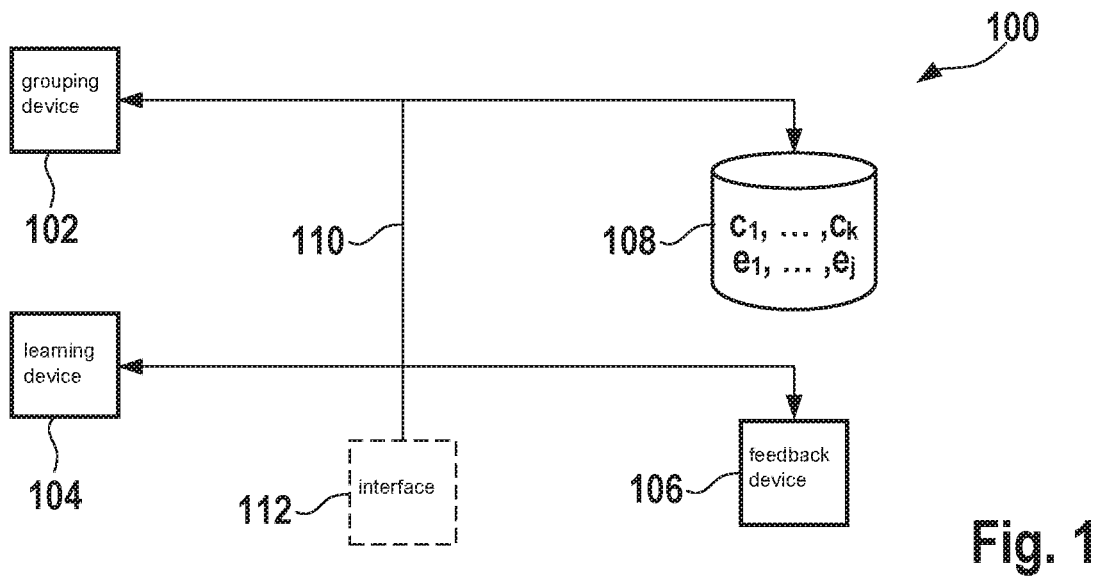
FIG. 1 shows a schematic illustration of a device for associating entities with clusters in accordance with an example embodiment of the present invention.
Figure 2:
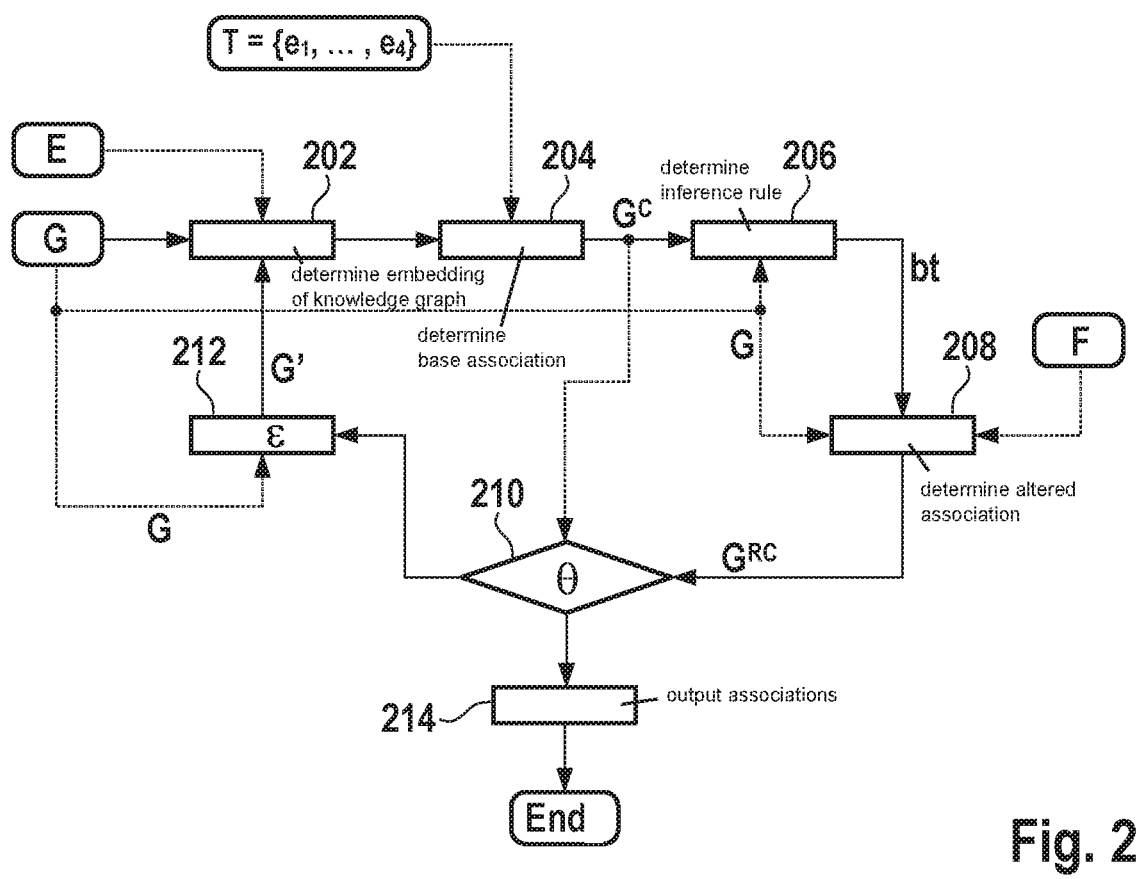
FIG. 2 shows a schematic illustration of a method for associating entities with clusters in accordance with an example embodiment of the present invention.

A knowledge graph represents collections of factual information that are linked to one another. This information is defined, for example, as facts, in the example as a set of triplets that indicate a subject, a predicate, and an object. In the example, it is assumed that this is an open knowledge graph that maps only a portion of the real world as information. Information about the world that is absent in the knowledge graph is regarded as unknown, not as incorrect. An example of a triplet for the subject "John," the predicate "works_at," and the object "Bosch" is <John, works_at, Bosch>. Triplets are depicted below in the representation predicate (subject, object). For the triplet example, this results in the representation works_at (John, Bosch).

An embedding, i.e., a knowledge graph embedding, may be provided for a knowledge graph. In the example, the embedding includes a model that maps the various elements of the knowledge graph, including the entities and the predicates, into a multidimensional, continuous vector space having a specific dimension. An n-dimensional vector space is used in the example, where n is a positive integer greater than 1. In this example, the entities may be either a subject or an object. The embedding of a set of the triplets of a knowledge graph takes place with the objective that some features that define the structure of the knowledge graph are maintained in the multidimensional vector space. For this purpose, these features are detected by a target function for the model with which the embedding is carried out.

For grouping the entities into clusters, a set of entities is grouped in such a way that the entities which with regard to a similarity measure in the multidimensional vector space are more similar than other entities are grouped into the same cluster.

In the example, a symbolic description is represented by a conjunctive query $d(X)$, a subject being used as argument $X$. The conjunctive query links a predefinable or predefined number m to triplets. For a number m=3, an example of a conjunctive query may be as follows:

$$d(X) = \text{is\_a}(X, \text{city}) \wedge \text{that is\_in}(X, \text{Germany}) \wedge \text{\_on the}(X, \text{Rhine})$$

This is a description for a concept with which cities in Germany that are on the Rhine River may be found. Examples of answers for X include the cities Cologne and Karlsruhe, provided that they are contained as subjects in entities in the knowledge graph.

An induction of inference rules relates to the learning of the inference rules from the knowledge graph. The objective of the learning for a predefined knowledge graph is to determine a set of inference rules of the form H←B. H refers to a head of the inference rule which is defined by a triplet of form $h(X, Y)$, where h defines a predicate, X defines a subject, and Y defines an object. B represents a trunk of the inference rule which is defined by conjunction of a number of i triplets of the form $b1(X1, Y1), \ldots, bi(Xi, Yi)$, where i is a positive integer greater than 1. Values $b1, \ldots, bi$ define predicates. Values $X1, \ldots, Xi$ define subjects. Values $Y1, \ldots, Yi$ define objects. Values $X1, Y1, \ldots, Xi, Yi$ may be constants or variables. An induced inference rule for an observation that humans live at the same location as their life partner, for example for predicates lives_in and married_to, is as follows:

$$\text{lives\_in}(X, Y) \leftarrow \text{lives\_in}(Z, Y) \wedge \text{married\_to}(Z, X)$$

where X, Y, Z each define either a subject or an object.

Based on such inference rules, new facts for association G, i.e., the knowledge graph in the example, may be determined with the aid of conclusions. Such a deductive procedure may take place based on a set of inference rules that represent a logic program, and based on background knowledge that represents facts. For example, for a predefined inference rule it is always deduced that the head is a true statement when the inference rule applies, i.e., when the trunk contains a true statement.

For example, the triplet lives_in(John, Germany) is deduced from an inference rule lives_in(X,Z)←works_at(X, Y)∧is_in(Y,Z) and the facts from triplets works_at(John, Bosch) and is_in(Bosch,Germany).

On this basis, a method is described below with which data are grouped into clusters in order to find a meaningful cluster for entities of a knowledge graph, and on the other hand to determine suitable descriptions for these clusters with the aid of symbolic learning.

A device 100 for this purpose is schematically illustrated in FIG. 1.

Device 100 includes a grouping device 102, a learning device 104, and a feedback device 106. The device includes a data memory 108. Grouping device 102, learning device 104, and feedback device 106 as well as data link 110 may be implemented in software and/or in hardware. Data memory 108 is designed to store facts and relationships of the facts, in particular in the form of a knowledge graph, as association G. In the example, facts in the form of entities $e_1, \ldots, e_j$, i.e., subjects and objects, and in the form of relationships, i.e., predicates, in particular in the form of the mentioned triplets, are stored in data memory 108. j refers to a positive integer that is different from zero, and that indicates a number of the entities of the knowledge graph.

Data memory 108 is designed to also store information concerning clusters $c_1, \ldots, c_k$. k refers to a positive integer that is different from zero, and that indicates a number of the clusters to be determined from a set of clusters C.

Grouping device 102, learning device 104, and feedback device 106 are designed to communicate with one another and with the data memory via a data link 110.

Grouping device 102 is designed to determine an association of target entities T with k clusters $c_1, \ldots, c_k$, based on association G and based on target entities T. Grouping device 102 is designed to determine associations G' in an iterative procedure as a function of a feedback value ε, which is determined as described below. It may be provided to also use, in addition to the mentioned input variables of grouping device 102, data of other external sources, for example text bodies. For this purpose, for example embeddings, i.e., vector representations of the entities on the basis of which the clusters are determined, may be provided. In this case, learning may take place based not just on the knowledge graph, but based on a combination of the knowledge graph and texts in which the entities occur. For this purpose, device 100 optionally includes an interface 112. In the example, grouping device 102 is designed to determine a base association $G^C$. Grouping device 102 is also designed, on this basis and based on a weighted symbolic description of clusters $c_1, \ldots, c_k$ determined for base association $G^C$, to determine an altered association $G^{RC}$.

Learning device 104 is designed to determine this weighted symbolic description of determined clusters $c_1, \ldots, c_k$ as a function of base association $G^C$ and knowledge graph G. Learning device 104 may be designed to determine the description as a function of a maximum length of a description m and/or a minimum coverage μ. Learning device 104 is designed to induce at least one inference rule as a function of base association $G^C$ and association G.

Feedback device 106 is designed to determine a feedback value ε for grouping device 102 as a function of determined clusters $c_1, \ldots, c_k$ and the determined description.

Device 100 is designed to determine, in iterations, different associations G' instead of association G, and for this purpose to determine different descriptions. In one aspect, feedback device 106 is designed to determine a difference $\Delta q_{diff}$ between base association $G^C$ and altered association $G^{RC}$, and to determine or not determine feedback value E for a further iteration as a function of difference $\Delta q_{diff}$. In this aspect, feedback device 106 is designed to store the association in data memory 108 or optionally to output it via interface 112 when the difference falls below a threshold value θ. In this case, device 100 is designed to carry out no further iteration.

An example method for grouping four target entities $T=\{e_1, \ldots, e_4\}$ to form two clusters $c_1, c_2$ is described below. The method is likewise applicable to a plurality of target entities, i.e., fewer or more than four target entities. The method is likewise applicable to a plurality of clusters, i.e., fewer or more than two clusters.

Solid-line arrows represent a preferred order of the steps, starting from knowledge graph G. Dashed-line arrows additionally mark individual input variables that are used for individual steps.

The method proceeds from association G, which in the example is predefined as a knowledge graph.

After the start, an embedding of association G is determined as a function of association G in a step 202. In the example, an embedding of the knowledge graph is determined for the knowledge graph. The embedding is optionally determined from an external source as a function of data E. Data E may be data that are extracted from a text collection.

As mentioned, the use of the knowledge graph itself is unfavorable, since the knowledge graph may be incomplete, for which reason it becomes difficult to indicate a similarity measure as a function of the structure of the knowledge graph.

Therefore, an embedding of the knowledge graph is determined in step 202. In the state space this compensates for the possibly missing information from the knowledge graph. In addition, it is easily possible to incorporate the additional text-based input variables, i.e., data E, into the state space. During learning of embeddings, i.e., of vector representations, various target functions may be combined: for example, a target function that ensures that the knowledge graph is well represented, and a further target function that ensures that a context of words in the text is well represented.

In the example, an embedding model is used that determines vectors in the state space as a function of association G, in the example, of the knowledge graph. Base association $G^C$ includes a map of at least a portion of association G into a multidimensional state space. In the iterations, the same procedure is carried out for association G'.

A step 204 is subsequently carried out.

A base association $G^C$ of the four target entities $T=\{e_1, \ldots, e_4\}$ to form the two clusters $c_1, c_2$ as a function of four target entities $T=\{e_1, \ldots, e_4\}$ and as a function of the embedding of the knowledge graph is made in step 204. For example, the vectors in the state space that define $T=\{e_1, \ldots, e_4\}$, and the number of desired clusters k, in the example k=2, are associated with a K-means algorithm. This results in a set of clusters C, each of the clusters including a subset of target entities $T=\{e_1, \ldots, e_4\}$. As a boundary condition it is assumed that these clusters are disjunct. In the example, triplets $bt(e_o, c_p: e_o \in c_p)$ are thus determined. Base association $G^C$ is, for example, a knowledge graph that is defined by triplets $bt(e_o, c_p)$. bt defines a predicate that indicates the association of an entity $e_o$ with a cluster $c_p$. For example, the following base association $G^C$ is determined with indices o=1, ..., 4 and p=1, 2 for the four target entities T={$e_1$, ..., $e_4$} and the two clusters $c_1$, $c_2$:

$$\{bt(e_1,c_1),bt(e_3,c_1),bt(e_2,c_2),bt(e_4,c_2)\}$$

In the example, for each cluster $c_p \in C$ from the set of clusters C, for each of entities $e_o$ from this cluster c facts for the knowledge graph of base association $G^C$ are determined which indicate that this entity $e_o$ is contained in this cluster $c_p$.

A step 206 is subsequently carried out.

At least one inference rule is induced as a function of base association $G^C$ in step 206. In a first iteration, association G is used for this purpose. In the further iterations, association G' is used for this purpose. The determination of association G' is described below. In the example, a union $G^{cluster}$ $\cup_{C_p \in c} G^c$ of the knowledge graphs of base association $G^C$ of all clusters $c_p$ is determined. As a function of union $G^{cluster}$, inference rules are learned with a coverage of at least μ, a head of form bt(X,c), and a trunk that includes a conjunction of at most m triplets. Predicate bt defines that an entity as subject X belongs to a cluster in object c. These inference rules define the association of entities with clusters via the relationships from association G or association G'. The body of inference rules thus learned corresponds to possible descriptions for the clusters.

Inference rules are induced in order to learn a symbolic description for the clusters. One, or in the example multiple, inference rule(s) is/are determined as candidates for each of heads bt(X,c). Predicate bt is not contained in the symbolic description of the cluster, since it itself is not contained in association G or association G'. In order to determine for each cluster the best possible description from the determined candidates, in the example an assessment is made using a point system that indicates the suitability of the description for differentiating one of clusters c' from the other of clusters c. In the following discussion, this assessment using the point system is referred to as differentiation quality $q_{diff}$ and is determined, for example, as:

$$q_{diff}(d, c, C) = \begin{cases} 0, \text{if } \min_{C' \in C \backslash c}\{cov(d, c, C) - cov(d, c', C)\} \leq 0 \\ \cos(d, c, C) - \frac{\Sigma_{C' \in C \backslash c} cov(d, c'C)}{|C \backslash c|}, \text{otherwise} \end{cases}$$

where d is the description, i.e., conjunctive query d(X) in the example, and cov(:) is a measure for the coverage of the particular argument. Differentiation quality $q_{diff}(d,c,C)$ is zero when description d describes a cluster $c' \in C$ better than a cluster c. Otherwise, differentiation quality $q_{diff}(d,c,C)$ is a difference between the coverage for description d for cluster c' and an average value for the coverage for description d for other clusters c from C.

In the example, the inference rule with the highest differentiation quality is selected as a function of this differentiation quality. In the example, a measure q for a quality of the selected inference rule is $$q(D, C) = \frac{1}{|D|}\sum_{i=1}^{|C|} q_{diff}(d_i, c_i, C)$$

In the example, the following inference rules are induced for predicates $p_1$, $p_2$, $p_3$, $p_4$:

$$bt(X,c_1) \leftarrow p_1,p_2. \quad q=0.9$$

$$bt(X,c_1) \leftarrow p_3. \quad q=0.6$$

$$bt(X,c_2) \leftarrow p_1,p_3. \quad q=0.8$$

$$bt(X,c_2) \leftarrow p_2,p_4. \quad q=0.5$$

The body of the particular inference rule is defined by predicates $p_1$, $p_2$, $p_3$, $p_4$ or a combination, i.e., in the example a conjunction, of same. For an entity X, the head of the inference rule indicates with which of clusters $c_1$, $c_2$ the entity is associated.

A step 208 is subsequently carried out.

Altered association $G^{RC}$ is determined as a function of the inference rules, base association $G^C$, and association G in step 208. Additional background knowledge F may optionally be used. For example, an inference rule may be used which is based on background knowledge F, and which is not, or does not have to be, learned.

Altered association $G^{RC}$ is determined as a function of the best inference rule, i.e., the inference rule with highest differentiation quality q, so that for a set of better clusters C' the following applies:

$$q(D,C') \geq q(D,C)$$

For this purpose, conclusions may be drawn as a function of target entities T and the best inference rules, on the basis of which new altered association $G^{RC}$ is determined. This may be stored in a weighted knowledge graph $G^{inferred}$ for altered association $G^{RC}$. In the example, the values of measure q for the quality of the particular inference rule are used as weights for this weighted knowledge graph $G^{inferred}$.

Measure q for the quality, and thus also the weight, for the association of entity $e_4$ with cluster $c_2$, for example, is determined to be $bt(e_4, c_2)q=0.7$, and for the association of entity $e_4$ with cluster $c_1$ is determined to be $bt(e_4, c_1) q=0.6$. In this case of conflict, for a consistent knowledge graph $G^{inferred\_consistent}$ the inference rule is selected with a larger measure q for the quality, i.e., q=0.7.

In the example, altered association $G^{RC}$ is determined as follows:

$$G^{RC} = G^{inferred\_consistent} \cup (G^{clusters} \backslash G^{inferred})$$

In the example, for clusters $c_1=\{e_1, e_3, e_4\}$ and $c_2=\{e_2\}$, using an altered association $c_1=\{e_1, e_3\}$ and $c_2=\{e_2, e_4\}$ due to $bt(e_4, c_2)$ q=0.7, altered association $G^{RC}$ is determined as:

$$\{bt(e_1,c_1),bt(e_3,c_2),bt(e_2,c_2),bt(e_4,c_2)\}$$

A step 210 is subsequently carried out.

A check is made in step 210 as to whether a difference $\Delta q_{diff}$ between base association $G^C$ and altered association $G^{RC}$ falls below threshold value θ. If the difference reaches or exceeds threshold value θ, a step 212 is carried out. Otherwise, a step 214 is carried out. In the example, a check is made as to whether difference $\Delta q_{diff}$ is less than threshold value θ:

$$\Delta q_{diff} = q_{diff}(D,C') - q_{diff}(D,C) \leq \theta$$

Feedback value ε is determined in step 212. Association G' is determined as a function of association G and feedback value ε. In the example, feedback value ε includes positive examples ε+ and negative examples ε−, which are determined as a function of association G and of altered association $G^{RC}$. In the example, each positive example $\varepsilon^+$ is defined by an association of an entity (which is contained in base association $G^C$ and also in altered association $G^{RC}$ based thereon, i.e., is maintained) with a cluster. Negative examples are not contained in both associations. Based on examples $\varepsilon = \varepsilon^+ \cup \varepsilon^-$, positive examples $\varepsilon^+$ are added to association G' as facts, and facts contained therein that correspond to a negative example $\varepsilon^-$ are removed from association G'.

Step 202 is subsequently carried out. In the example, association G' is used instead of association G in each new iteration.

The association of the target entities with the clusters is output or stored in step 214. In the example, the weighted symbolic description is also determined. After multiple iterations, the following, for example, is output as the result:

$$c1 = \{e_1, e_3, e_4\} | bt(X, c_1) \leftarrow p_1, p_2. \ q = 0.98$$

$$c2 = \{e_2\} | bt(X, c_2) \leftarrow p_1, p_3. \ q = 0.95$$

The method subsequently ends.

The method is suitable for classifying different types of data. The concepts, the scenes, or the objects contained therein are thus learned, based on the data of digital images. For image processing, for example a plurality of digital images is provided. In this case, for each of the digital images one of target entities $e_1, \ldots, e_j$ is determined. One of target entities $e_1, \ldots, e_j$ for a certain digital image is determined, for example, as a function of data or metadata of the particular digital image. In the example, the data or metadata characterize an object from the digital image. The digital images may be annotated for this purpose. The annotation may already be predefined, or may be determined in an object recognition. The association of target entities $e_1, \ldots, e_j$ is determined, for example, to form at least one cluster $c_1, \ldots, c_k$ that represents a concept, a scene, or an object.

What is claimed is:

1. A computer-implemented method for grouping target entities into clusters and storing the target entities into a knowledge graph, the method comprising:
   in a computation step for the target entities, determining a base association in which a cluster is associated with each of the target entities as a function of an association for entities;
   determining inference rules as a function of the association for entities and as a function of the base association, each of the inference rules defining an association of entities with one of the clusters;
   determining an altered association as a function of the association for entities and the inference rules, wherein the base association includes subjects and objects as entities, the subjects representing the target entities, the objects representing clusters, the association defining predicates, each of the predicates associating an object with a subject, each of the inference rules including a trunk and a head that is associated with the trunk, wherein the head is a triplet of form h(X, Y), where h defines a predicate, X defines a subject, and Y defines an object, the trunk being defined as a function of at least one predicate or as a function of a conjunction of at least two predicates, the head defining, for a subject that represents one of the target entities, with which of the objects, which represent the clusters, the subject is associated;
   checking whether a difference between the base association and the altered association falls below a threshold value;
   based on the difference falling below the threshold value, outputting or storing an association of the target entities with the clusters; and
   based on the different not falling below the threshold, (i) determining a feedback value as a function of the difference, and (ii) determining a replacement association as a function of the association for entities and the feedback value, which replaces the association for a new execution of the computation step.

2. The method as recited in claim 1, wherein a symbolic description of the clusters is determined as a function of the association for entities, the symbolic description being output or stored.

3. The method as recited in claim 1, wherein, for each inference rule of the inference rules, a measure for a quality of the inference rule is determined that defines an association of entities with the same cluster, and the inference rule with the greatest measure for the quality compared to the other of the inference rules for the same cluster being selected.

4. The method as recited in claim 1, wherein the base association includes a map of at least a portion of the association for entities into a multidimensional state space, the inference rules being determined as a function of the map.

5. The method as recited in claim 1, wherein the entities include subjects and objects, the association of entities defining predicates, each of the predicates associating an object with a subject, as a function of the feedback value, at least one predicate for an object and a subject being determined that is added to the association for the new execution of the computation step, or is removed from the association.

6. The method as recited in claim 1, wherein a first inference rule is provided based on background knowledge, independently of the base association, the altered association being determined as a function of the association for entities, the inference rules, and the first inference rule.

7. The method as recited in claim 1, wherein the entities include subjects and objects, the association defining predicates, each of the predicates associating an object with a subject, the symbolic description being defined as a function of at least one of the predicates or as a function of a conjunction of at least two predicates.

8. The method as recited in claim 1, wherein a plurality of digital images is provided, one of the target entities that characterizes an object from the digital image being determined for each of the digital images as a function of data or metadata of the digital image, the association of the target entities with at least one cluster that represents a concept, a scene, or an object being determined.

9. A device for grouping target entities into clusters and storing the target entities into a knowledge graph, the device comprising:
   a data memory for associations and inference rules;
   a grouping device configured to determine a base association in which a cluster is associated with each of the target entities, as a function of the target entities and as a function of an association for entities;
   a learning device configured to determine inference rules as a function of the association for entities and as a function of the base association, each of the inference rules defining an association of entities with one of the clusters, the learning device being configured to determine an altered association as a function of the association for entities and the inference rules, wherein the base association includes subjects and objects as entities, the subjects representing the target entities, the objects representing clusters, the association defining predicates, each of the predicates associating an object with a subject, each of the inference rules including a trunk and a head that is associated with the trunk, wherein the head is a triplet of form h(X, Y), where h defines a predicate, X defines a subject, and Y defines an object, the trunk being defined as a function of at least one predicate or as a function of a conjunction of least two predicates, the head defining, for a subject that represents one of the target entities, with which of the objects, which represent the clusters, the subject is associated; and a feedback device configured to check whether a difference between the base association and the altered association falls below a threshold value, and if the difference falls below the threshold value, to output or store an association of the target entities with the clusters, and that otherwise determines a feedback value as a function of the difference, and determines a replacement association that replaces the association, as a function of the association for entities and the feedback value.

10. The device as recited in claim 9, wherein the device is configured to determine a symbolic description of the clusters as a function of the association for entities, and to output or store the symbolic description.

11. A non-transitory machine-readable memory medium on which is stored a computer program for grouping target entities into clusters and storing the target entities into a knowledge graph, the computer program, when executed by a computer, causing the computer to perform:

in a computation step for the target entities, determining a base association in which a cluster is associated with each of the target entities as a function of an association for entities;

determining inference rules as a function of the association for entities and as a function of the base association, each of the inference rules defining an association of entities with one of the clusters, wherein the base association includes subjects and objects as entities, the subjects representing the target entities, the objects representing clusters, the association defining predicates, each of the predicates associating an object with a subject, each of the inference rules including a trunk and a head that is associated with the trunk, wherein the head is a triplet of form h(X, Y), where h defines a predicate, X defines a subject, and Y defines an object, the trunk being defined as a function of at least one predicate or as a function of a conjunction of least two predicates, the head defining, for a subject that represents one of the target entities, with which of the objects, which represent the clusters, the subject is associated;

determining an altered association as a function of the association for entities and the inference rules;

checking whether a difference between the base association and the altered association falls below a threshold value;

based on the difference falling below the threshold value, outputting or storing an association of the target entities with the clusters; and based on the different not falling below the threshold, (i) determining a feedback value as a function of the difference, and (ii) determining a replacement association as a function of the association for entities and the feedback value, which replaces the association for a new execution of the computation step.

* * * * *